US009838922B2

(12) United States Patent
Pelletier et al.

(10) Patent No.: US 9,838,922 B2
(45) Date of Patent: *Dec. 5, 2017

(54) METHOD AND APPARATUS FOR PERFORMING SERVING HIGH SPEED DOWNLINK SHARED CHANNEL CELL CHANGE (71) Applicant: InterDigital Patent Holdings, Inc., Wilmington, DE (US)

(72) Inventors: Benoit Pelletier, Roxboro (CA); Diana Pani, Montreal (CA); Paul Marinier, Brossard (CA); Christopher R. Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,625

(22) Filed: Apr. 20, 2016

(65) Prior Publication Data

US 2016/0234732 A1    Aug. 11, 2016

Related U.S. Application Data (63) Continuation of application No. 12/537,555, filed on Aug. 7, 2009, now Pat. No. 9,351,202.
(Continued)

(51) Int. Cl.
*H04W 36/00* (2009.01)
*H04W 72/04* (2009.01)
*H04W 76/04* (2009.01)

(52) U.S. Cl.
CPC ..... *H04W 36/0055* (2013.01); *H04W 72/042* (2013.01); *H04W 76/046* (2013.01)

(58) Field of Classification Search
CPC .......... H04W 36/0055; H04W 76/046; H04W 72/042; H04W 36/0061; H04W 36/0083; H04W 36/08
See application file for complete search history.

(56) References Cited

U.S. PATENT DOCUMENTS

2003/0189909 A1   10/2003   Chao et al.
2006/0077923 A1    4/2006   Niwano
(Continued)

FOREIGN PATENT DOCUMENTS

CN    1972507      5/2007
CN    101237698    8/2008
(Continued)

OTHER PUBLICATIONS

"Taiwanese Office Action", Taiwanese Application No. 104110943, dated May 11, 2016, 10 pages.
(Continued)

*Primary Examiner* — Thai Nguyen
(74) *Attorney, Agent, or Firm* — Youngae Kim (57) ABSTRACT A method and an apparatus for serving high speed downlink shared channel (HS-DSCH) cell change are disclosed. A wireless transmit/receive unit (WTRU) receives pre-configured serving cell information for a target cell. The WTRU reports a measurement report and starts monitoring a high speed shared control channel (HS-SCCH) on the target cell. The WTRU may receive an HS-SCCH order over the target cell and/or a radio resource control (RRC) reconfiguration message over a source cell indicating a serving HS-DSCH cell change to the target cell. The WTRU may act upon all information elements of the RRC reconfiguration message in case that the RRC reconfiguration message is received prior to the HS-SCCH order, and act upon the pre-configured (Continued)

serving cell information in case that the HS-SCCH order is received prior to the RRC reconfiguration message.

16 Claims, 4 Drawing Sheets

Related U.S. Application Data (60) Provisional application No. 61/087,531, filed on Aug. 8, 2008.

(56) References Cited

U.S. PATENT DOCUMENTS

| | | |
|---|---|---|
| 2006/0089142 A1 | 4/2006 | Vuorinen et al. |
| 2006/0116118 A1 | 6/2006 | Charriere et al. |
| 2007/0049278 A1 | 3/2007 | Lindoff et al. |
| 2007/0184838 A1 | 8/2007 | Van Der Velde et al. |
| 2008/0188220 A1 | 8/2008 | DiGirolamo et al. |
| 2008/0254800 A1 | 10/2008 | Chun et al. |
| 2010/0027503 A1 | 2/2010 | Eravelli et al. |
| 2011/0014917 A1 | 1/2011 | Wager et al. |

FOREIGN PATENT DOCUMENTS

| | | | |
|---|---|---|---|
| EP | 1773009 | 4/2007 | |
| JP | 2011-517179 | 5/2011 | |
| RU | 2006 145 199 A | 7/2008 | |
| TW | EP 1408658 A2 * | 4/2004 | .......... H04W 76/068 |
| TW | 200729984 | 10/2005 | |
| WO | WO-2005/002269 | 6/2005 | |
| WO | WO-2006/000876 | 1/2006 | |
| WO | WO-2006/035297 | 4/2006 | |
| WO | WO-2006/114698 | 11/2006 | |
| WO | WO-2006/134480 | 12/2006 | |
| WO | WO-2007/040331 | 4/2007 | |
| WO | WO-2008/024064 | 2/2008 | |
| WO | WO-2009/116929 | 9/2009 | |

OTHER PUBLICATIONS

"Taiwanese Office Action (English Translation)", Taiwanese Application No. 104110943, dated May 11, 2016, 6 pages.
U.S. Appl. No. 61/038,222, filed Mar. 20, 2008, Apr 8, 2013, 21 pages.
"3rd Generation Partnership Project, Technical Specification Group Radio Access Network; Radio Resource Control (RRC); Protocol Specification (Release 7)", 3GPP TS 25.331 V7.9.1, Aug. 2008, 1475 pages.
"3rd Generation Partnership Project, Technical Specification Group Radio Access Network; Radio Resource Control (RRC); Protocol Specification (Release 7)", 3GPP TS 25.331 V7.13.0, Jun. 2009, 1486 pages.
"3rd Generation Partnership Project, Technical Specification Group Radio Access Network; Radio Resource Control (RRC); Protocol Specification (Release 8)", 3GPP TS 25.331 V8.3.1, Aug. 2008, 1494 pages.
"3rd Generation Partnership Project: Technical Specification Group Radio Access Network; Physical layer procedures (FDD) (Release 8)", 3GPP TS 25.214 V8.6.0, May 2009, 92 pages.
"3rd Generation Partnership Project; Technical Specification Group Radio Access Network; Physical layer procedures (FDD) (Release 7)", 3GPP TS 25.214 V7.9.0, May 2008, 85 pages.
"3rd Generation Partnership Project; Technical Specification Group Radio Access Network; Physical layer procedures (FDD) (Release 7)", 3GPP TS 25.214 V7.12.0, May 2009, 87 pages.
"3rd Generation Partnership Project; Technical Specification Group Radio Access Network; Physical layer procedures (FDD) (Release 8)", 3GPP TS 25.214 V8.2.0, May 2008, 87 pages.
"3rd Generation Partnership Project; Technical Specification Group Radio Access Network; Radio Resource Control (RRC); Protocol Specification (Release 8)", 3GPP TS 25.331 V8.7.0, Jun. 2009, 1685 pages.
"Chinese Office Action", Chinese Application No. 200980131005.5, dated Feb. 22, 2013, 6 pages.
"Chinese Office Action (English Translation)", Chinese Application No. 200980131005.5, dated Feb. 22, 2013, 8 pages.
"Improving Reliability of HS-PDSCH Serving Cell Change Procedure", 3GPP Tdoc R1-080815; 3GPP TSG-RAN WG1 Meeting #52, Sorrento, Italy, Feb. 11-15, 2008, 8 pages.
"Japanese Notice of Allowance", Japanese Application No. 2014-165951, dated Mar. 8, 2016, 3 pages.
"Japanese Notice of Allowance", Japanese Application No. 2013-129797, dated Jun. 17, 2014, 6 pages.
"Japanese Notice of Allowance (English Translation)", Japanese Application No. 2014-165951, dated Mar. 8, 2016, 3 pages.
"Japanese Notice of Rejection", Japanese Application No. 2011-522266, dated Aug. 28, 2012, 2 pages.
"Japanese Notice of Rejection", Japanese Patent Application No. 2014-165951, dated Sep. 29, 2015, 3 pages.
"Japanese Notice of Rejection (English Translation)", Japanese Application No. 2011-522266, dated Aug. 28, 2012, 2 pages.
"Japanese Notice of Rejection (English Translation)", Japanese Patent Application No. 2014-165951, dated Sep. 29, 2015, 4 pages.
"Official Notice of Rejection", Japanese Patent Application No. 2011-522266, dated Aug. 28, 2012, 2 pages.
"Official Notice of Rejection (Translation)", Japanese Patent Application No. 2011-522266, dated Aug. 28, 2012, 2 pages.
"Russian Decision on Grant", Russian Patent Application No. 2011108554/07(012298), dated May 11, 2012, 11 pages.
"Russian Decision on Grant (Translation)", Russian Patent Application No. 2011108554/07(012298), dated May 11, 2012, 7 pages.
"Taiwan Office Action", Taiwan Application No. 098126675, dated May 21, 2014, 3 Pages.
"Taiwan Office Action (English Translation)", Taiwan Application No. 098126675, dated May 21, 2014, 2 Pages.
"United States Non-Final Office Action", U.S. Appl. No. 12/537,555, filed Aug. 16, 2012, 18 pages.
Ericsson, "Analysis of the Stage 3 impact from HS serving cell change", 3GPP Tdoc R2-083966, 3GPP TSG RAN WG2 Meeting #63m Jeju Island, Korea, Aug. 18-22, 2008, 8 pages.
Ericsson, "HS-DSCH Serving Cell Change Enhancements", 3GPP TSG RAN WG2 #62bis, Tdoc R2-083126, Jun. 20, 2008, 5 pages.
Ericsson, "Introduction of HS-DSCH cell change enhancements", 3GPP Tdoc R2-083128, Change Request 25.308 V8.2.0, 3GPP TSG RAN WG2 #62bis, Warsaw, Poland, Jun. 30-Jul. 4, 2008.
Ericsson, "Introduction of HS-DSCH Cell Change Enhancements", 3GPP TSG-RAN WG2 #62bis, Tdoc R2-083628, Warsaw, Poland, Jun. 30-Jul. 4, 2003, 3 pages.
Ericsson, "Introduction of HS-DSCH Cell Change Enhancements", 3GPP TSG-RAN WG2 #64, R2-087305, Prague, Czech Republic, Nov. 10-14, 2008, 48 pages.
Nokia Corporation, et al., "Compromise proposal for HS-PDSCH serving cell change enhancement", 3GPP Tdoc R2-083326, 3GPP TSG-RAN WG2 Meeting #62bis, Warsaw, Poland, Jun. 30-Jul. 4, 2008, 2 pages.
Panasonic, "Cell Reselection and evaluation during RRC Connection procedure", 3GPP TSG RAN WG2 #60bis, R2-080079, Sevilla, Spain, Resubmission of R2-075549, 4847, Jan. 14-18, 2008, 3 pages.
Qualcomm Europe, "Link Analysis of HS-SCCH based and E-RGCH based Serving Cell Change Command Schemes", 3GPP Tdoc R1-081355, 3GPP TSG-RAN WG1 #52-bis, Shenzhen, China, Mar. 31-Apr. 4, 2008, 9 pages.
Wager, Stefan Henrik A., "Method and Arrangement in a Telecommunication System", Mar. 20, 2008, 22 Pages.
"First Notification of Office Action (English Translation)" dated Apr. 1, 2017 of the corresponding Chinese Patent Application No. 201410483017.7, 5 pages.
"First Notification of Office Action" dated Apr. 1, 2017 of the corresponding Chinese Patent Application No. 201410483017.7, 6 pages.
"Abstract," of the Chinese Patent Application Publication No. 1972507, May 30, 2007, 1 page.

(56) References Cited

OTHER PUBLICATIONS

"Abstract" of the Chinese Patent Application Publication No. 101237698, Aug 6, 2008, 1 page.
"Extended European Search Report", European Application No. 14152270.6, Aug 18, 2017, 10 pages.
Nokia Corporation, et al., "25.331 CR with comments", 3GPP Tdoc R2-083346, 3GPP TSG-RAN WG2 Meeting #62bis, Warsaw, Poland, Jun. 30, 2008-Jul. 4, 2008, 120 pages.

* cited by examiner

METHOD AND APPARATUS FOR PERFORMING SERVING HIGH SPEED DOWNLINK SHARED CHANNEL CELL CHANGE

CROSS REFERENCE TO RELATED APPLICATIONS

This application is a continuation of U.S. patent application Ser. No. 12/537,555, filed on Aug. 7, 2009, which claims the benefit of U.S. provisional application No. 61/087,531 filed Aug. 8, 2008, each of which is incorporated by reference as if fully set forth.

FIELD OF INVENTION

This application is related to wireless communications.

BACKGROUND

High speed downlink packet access (HSDPA) is a feature that was introduced in Release 5 of the third generation partnership project (3GPP) specification. HSDPA achieves maximum spectral efficiency using three key concepts: adaptive modulation and coding (AMC), fast physical layer retransmissions implementing hybrid automatic repeat request (HARQ), and fast Node B scheduling.

Handover is a process in which a wireless transmit/receive unit (WTRU) switches from one cell to another without service interruption. In HSDPA, the WTRU monitors a high speed shared control channel (HS-SCCH) in a single cell, which is called a "serving high speed downlink shared channel (HS-DSCH) cell". When a handover occurs, the WTRU needs to switch to a new serving HS-DSCH cell (target cell) and stop communication with the old serving HS-DSCH cell (source cell). This procedure is called serving HS-DSCH cell change.

Two types of handovers exist: synchronized and unsynchronized handovers. In an unsynchronized handover, the network and the WTRU do not activate the resources and switch at the same time. The activation time for the WTRU is set to "now." This reduces the delays associated with the handover procedure, but it increases the probability of losing data.

In a synchronized handover, the network and the WTRU perform the change of resources simultaneously. The network has to set the activation time to a conservative value to account for any kind of delays such as scheduling delay, retransmissions, configuration time, etc. Even though the synchronized handover minimizes data losses it may result in higher delays.

Conventionally, the radio resource control (RRC) handover message is sent to the WTRU via the source cell. The delay associated with the serving HS-DSCH cell change may cause the handover message to fail, thus resulting in an unacceptable rate of dropped calls.

In order to improve the reliability of the serving HS-DSCH cell change procedure, it has been proposed to pre-configure target cell information or parameters. The pre-configuration of the target cell information or parameters adds robustness to the serving HS-DSCH cell change procedure by allowing the network to send the serving HS-DSCH cell change command either over the source cell or the target cell. The use of target cell pre-configuration is configured by the network during the active set update procedure.

A WTRU continuously measures the signal strength of neighboring cells. Based on the measurements on neighboring cells, a WTRU transmits a MEASUREMENT REPORT 1A or 1C message containing intra-frequency measurement results requesting addition of a new cell into the active set. As part of the active set update procedure, the SRNC establishes a new radio link in the target Node B for the dedicated physical channels. The SRNC then transmits an ACTIVE SET UPDATE message to the WTRU. The ACTIVE SET UPDATE message includes the necessary information for establishment of the dedicated physical channels in the added radio link. If the SRNC decides to pre-configure the target cell, the ACTIVE SET UPDATE message will also include serving HS-DSCH cell related configuration, (e.g., H-RNTI, HS-SCCH configuration, etc.), for the target cell. When the WTRU has added the new radio link, the WTRU returns an ACTIVE SET UPDATE COMPLETE message.

When the WTRU detects a change of best cell, the WTRU transmits a MEASUREMENT REPORT 1D message to request the change of the HS-DSCH serving cell to a target cell. The report contains the measured value and the cell identity (ID). The WTRU then starts monitoring one of the pre-configured HS-SCCH(s) in the target cell in addition to the HS-SCCH(s) in the source cell.

Upon reception of this event, a serving RNC (SRNC) makes a decision to perform a handover to a new cell. The SRNC requests the controlling RNC (CRNC) to allocate HS-DSCH resources, (such as HS-DSCH radio network temporary identity (H-RNTI), HS-SCCH codes, HARQ resources, etc.), for the WTRU in the target cell via radio network subsystem application part (RNSAP) and Node B application part (NBAP) messages. Once the HS-DSCH resources are reserved, the CRNC provides all the information to the SRNC, which in turn sends an RRC handover message to the WTRU over the source cell.

The SRNC may send a RADIO BEARER SETUP message, a RADIO BEARER RECONFIGURATION message, a TRANSPORT CHANNEL RECONFIGURATION message, or a PHYSICAL CHANNEL RECONFIGURATION message, which indicates the target HS-DSCH cell and optionally an activation time to the WTRU. The RRC message may also include a configuration of transport channel related parameters for the target HS-DSCH cell, including an indication to reset the MAC-hs or MAC-ehs entity.

In parallel, the target Node B may transmit an HS-SCCH order in the target cell to initiate the serving HS-DSCH cell change. This HS-SCCH order may be referred to as a HS-DSCH serving cell change order, or as target cell HS-SCCH order. If the WTRU has not received the RRC message, (i.e., RADIO BEARER SETUP message, RADIO BEARER RECONFIGURATION message, TRANSPORT CHANNEL RECONFIGURATION message, or PHYSICAL CHANNEL RECONFIGURATION message), the WTRU will upon receiving the HS-SCCH order in the target cell execute serving HS-DSCH cell change.

When the WTRU has completed the serving HS-DSCH cell change, the WTRU returns a RADIO BEARER SETUP COMPLETE message, a RADIO BEARER RECONFIGURATION COMPLETE message, a TRANSPORT CHANNEL RECONFIGURATION COMPLETE message, or a PHYSICAL CHANNEL RECONFIGURATION COMPLETE message to the network, regardless if the cell change was triggered by reception of the RRC message in the source cell or by reception of the HS-SCCH order in the target cell.

When an enhanced serving cell change procedure is used, the network will be configured to send the RRC message to the WTRU over the source cell or an HS-SCCH order over the target cell if configured. However, the RRC message might not be successfully delivered due to degrading radio conditions in the source cell. In addition, a problem occurs when the WTRU receives both RRC message and the target cell HS-SCCH order and they conflict with each other. For instance, when a target cell HS-SCCH order is received, the RRC entity in the WTRU is supposed to perform the serving HS-DSCH cell change within a required time period, (i.e., 40 ms). However the RRC message may contain a connection frame number (CFN) as an activation time that occurs much later than the 40 ms limit. Additionally, the RRC message may contain new configuration parameters that may conflict with the pre-configured HS-DSCH parameters. This may cause ambiguity in the WTRU. On the network side, this may cause problems since at the time the network considers the WTRU is ready and rerouted data to the target cell, the network may not know which configuration the WTRU is using and at what time the reconfiguration is performed, (i.e., 40 ms after the target cell HS-SCCH order or at the activation time given in the RRC message). This is due to the fact that the WTRU might have not received the RRC message and may have reconfigured using the old pre-configured parameters. In addition, in case both messages are received, the WTRU behavior on how and which message to process in the RRC entity have to be defined.

SUMMARY

A method and an apparatus for serving HS-DSCH cell change are disclosed. A WTRU receives pre-configured serving cell information or parameters for a target cell from the network. The WTRU reports a measurement report and starts monitoring an HS-SCCH from the target cell. The WTRU may receive an HS-SCCH order over the target cell and/or an RRC reconfiguration message over a source cell indicating a serving HS-DSCH cell change to the target cell. The WTRU may act upon all information elements of the RRC reconfiguration message in the case that the RRC reconfiguration message is received prior to the target cell HS-SCCH order, and act upon the pre-configured serving cell parameters in the case that the target cell HS-SCCH order is received prior to the RRC reconfiguration message. The WTRU may stop monitoring the HS-SCCH on the target cell on a condition that the RRC reconfiguration message is received prior to reception of the target cell HS-SCCH order. The WTRU may ignore the RRC reconfiguration message received after reception of the target cell HS-SCCH order.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

Hereinafter, the terminology "pre-configured serving cell information" refers to serving cell parameters or information elements that are provided to the WTRU as part of the active set update procedure including, but not limited to, the HS-DSCH parameters, (such as HS-SCCH code, HARQ info, H-RNTI, etc), and optionally enhanced dedicated channel (E-DCH) parameters, (such as E-DCH absolute grant channel (E-AGCH), E-DCH radio network temporary identity (E-RNTI) and serving cell E-DCH relative grant channel (E-RGCH), E-DCH HARQ indicator channel (E-HICH), etc.). The pre-configured serving cell information will allow the WTRU to perform a fast serving cell change to the target cell once an HS-SCCH order for the handover is received over the target cell. The terminologies "parameter" and "information" or "information element" may be used interchangeably. Hereinafter, the terminologies "HS-SCCH order," "HS-DSCH serving cell change order" and "target cell HS-SCCH order" may be used interchangeably.

Figure 1:
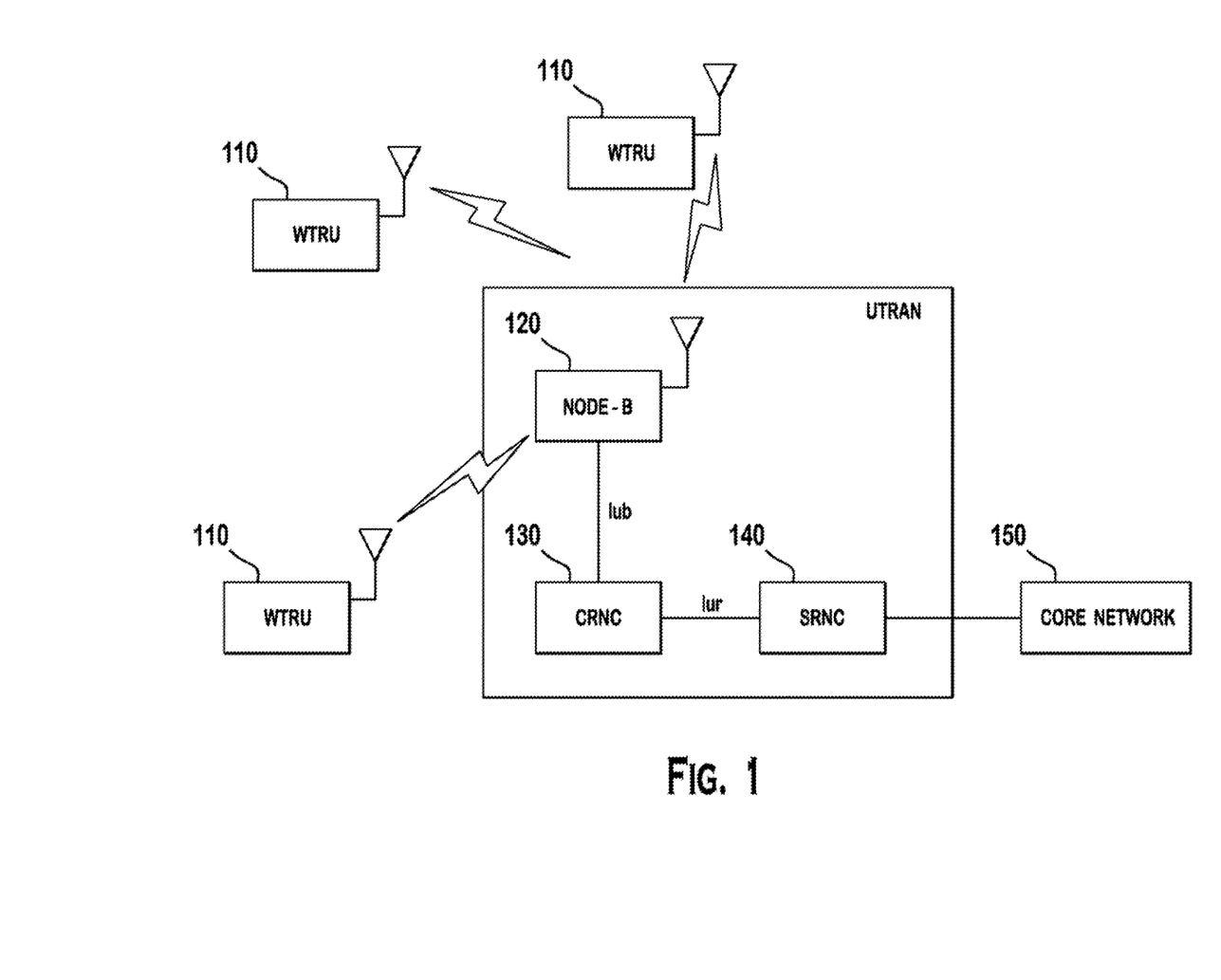
FIG. 1 shows a wireless communication system.

FIG. 1 shows a wireless communication system 100 including a plurality of WTRUs 110, a Node B 120, a controlling radio network controller (CRNC) 130, a serving radio network controller (SRNC) 140, and a core network 150. The Node B 120 and the CRNC 130 may collectively be referred to as the universal terrestrial radio access network (UTRAN).

As shown in FIG. 1, the WTRUs 110 are in communication with the Node B 120, which is in communication with the CRNC 130 and the SRNC 140. Although three WTRUs 110, one Node B 120, one CRNC 130, and one SRNC 140 are shown in FIG. 1, it should be noted that any combination of wireless and wired devices may be included in the wireless communication system 100.

Figure 2:
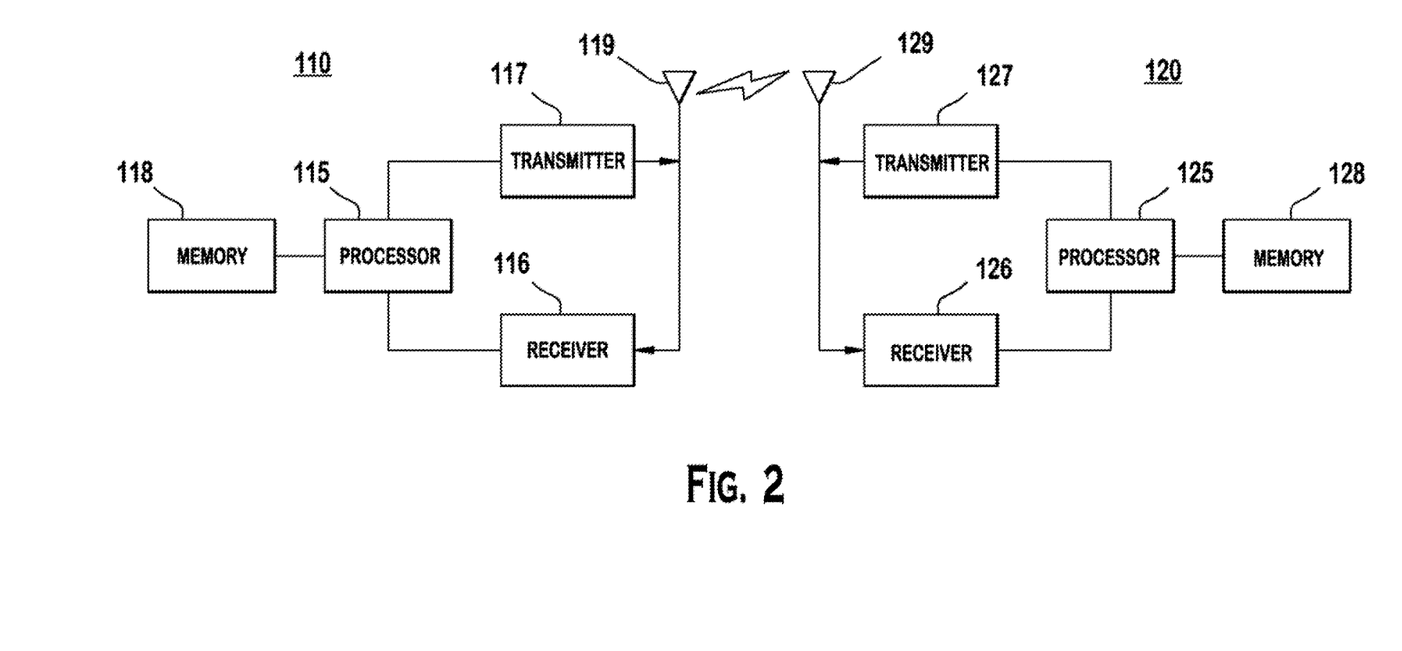
FIG. 2 is a functional block diagram of a WTRU and the Node-B of the wireless communication system of FIG. 1.

FIG. 2 is a functional block diagram of a WTRU 110 and the Node B 120 of the wireless communication system 100 of FIG. 1. As shown in FIG. 2, the WTRU 110 is in communication with the Node B 120 and both are configured to perform a method of performing serving HS-DSCH cell change.

In addition to the components that may be found in a typical WTRU, the WTRU 110 includes a processor 115, a receiver 116, a transmitter 117, a memory 118, and an antenna 119. The memory 118 is provided to store software including operating system, application, etc. The processor 115 is provided to perform, alone or in association with the software, a method of serving HS-DSCH cell change in accordance with embodiments disclosed below. The receiver 116 and the transmitter 117 are in communication with the processor 115. The antenna 119 is in communication with both the receiver 116 and the transmitter 117 to facilitate the transmission and reception of wireless data.

In addition to the components that may be found in a typical base station, the Node B 120 includes a processor 125, a receiver 126, a transmitter 127, a memory 128, and an antenna 129. The processor 125 is configured to support a method of serving HS-DSCH cell change in accordance with embodiments disclosed below. The receiver 126 and the transmitter 127 are in communication with the processor 125. The antenna 129 is in communication with both the receiver 126 and the transmitter 127 to facilitate the transmission and reception of wireless data.

As part of the serving HS-DSCH cell change procedure, the network sends an RRC message to the WTRU over the source cell, ordering a change of best cell and providing configuration parameters (i.e., information elements) required by the WTRU. The RRC message maybe, but is not limited to, a radio bearer reconfiguration message, a radio bearer setup or release message, a transport channel reconfiguration message, or a physical channel reconfiguration message. Hereafter, these RRC messages will be referred to as "RRC reconfiguration message."

The RRC reconfiguration message may contain a set of serving cell information, (such as the HS-DSCH and E-DCH parameters) and optionally an activation time for the serving HS-DSCH cell change that is different from "now." The serving cell information included in the RRC reconfiguration message may be the same as the pre-configured serving cell information or may include new information different from the pre-configured serving cell information. The new serving cell information may include radio bearer information elements, transport channel parameters, or physical channel parameters.

WTRU behaviors during the serving HS_DSCH cell change are disclosed below.

In case the WTRU receives an RRC reconfiguration message over the source cell before receiving an HS-SCCH order over the target cell, the WTRU may perform the reconfiguration according to the information contained in the RRC reconfiguration message and may ignore the subsequently received target cell HS-SCCH order. If an activation time is specified in the RRC reconfiguration message, the WTRU may stop monitoring an HS-SCCH in the target cell until the activation time expires and the WTRU reconfigures to the new cell.

Alternatively, even if the WTRU received the RRC reconfiguration message with an activation time (different from "now"), once the WTRU receives an HS-SCCH order, the WTRU may initiate the reconfiguration to the target cell even if the activation time has not been reached yet. If new parameters are included in the RRC reconfiguration message the WTRU may apply these parameters before the activation time if the HS-SCCH order is received.

In the case that the WTRU receives an HS-SCCH order over the target cell before receiving an RRC reconfiguration message over the source cell, the WTRU may immediately act on the target cell HS-SCCH order and initiate the reconfiguration procedure to the target cell. When the RRC reconfiguration message is received, the WTRU decodes the RRC reconfiguration message and if the serving cell information included in the RRC reconfiguration message is different from the pre-configured serving cell information, the WTRU may stop the reconfiguration procedure and apply the one provided in the RRC reconfiguration message. If an activation time is provided in the RRC reconfiguration message, the WTRU may ignore the activation time and perform the reconfiguration right away. Alternatively, the WTRU may stop the ongoing reconfiguration, go back to the source cell, and wait for the activation time to expire.

Alternatively, the WTRU may only act on the target cell HS-SCCH order and ignore the subsequent RRC reconfiguration message. The WTRU may reconfigure according to the pre-configured serving cell information and may disregard any new parameters or information provided in the RRC reconfiguration message.

Alternatively, the WTRU may act on the target cell HS-SCCH order, reconfigure according to the pre-configured serving cell information (even if the RRC reconfiguration message contains conflicting parameters or information) and act on any new parameters or information in the RRC reconfiguration message that are not part of the pre-configured serving cell information for the target cell.

In the case that the WTRU does not receive the RRC reconfiguration message due to the degrading channel condition in the source cell, the WTRU acts on the target cell HS-SCCH order and performs the reconfiguration upon reception of a target cell HS-SCCH order. Once the reconfiguration is completed the WTRU prepares and sends an RRC complete message. The WTRU may indicate to the network that only the target cell HS-SCCH order was received. After receiving the RRC complete message along with this indication, if additional configuration parameters have been sent in the RRC reconfiguration message, the network may retransmit the RRC reconfiguration message to ensure that the WTRU performs a proper reconfiguration. Optionally, the WTRU may also indicate the time at which the handover occurred. This may assist the network in determining the last packet sent and received from the source cell and retransmit those packets.

Message priority may be defined so that the WTRU may treat the RRC reconfiguration message and the target cell HS-SCCH order in accordance with the priority.

In accordance with one embodiment, the WTRU may be configured to treat the RRC reconfiguration message and the target cell HS-SCCH order in the order of reception. More specifically, if a serving HS-DSCH cell change procedure has been initiated by one of the RRC reconfiguration message and the target cell HS-SCCH order, the WTRU may ignore a subsequently received message, (i.e., target cell HS-SCCH order or RRC reconfiguration message), and continues with execution of the current process. For instance, if the WTRU receives a target cell HS-SCCH order first, the WTRU may ignore and reject the subsequently received RRC reconfiguration message, or vice versa.

Alternatively, the RRC reconfiguration message may override the pre-configured serving cell configuration. More specifically, the WTRU may be configured to always give priority to the RRC reconfiguration message despite that a target cell HS-SCCH order may have initiated the serving HS-DSCH cell change procedure. If, at the time of reception of an RRC reconfiguration message, the WTRU has an ongoing serving HS-DSCH cell change procedure started by the reception of an HS-SCCH order over the target cell), the ongoing serving HS-DSCH cell change procedure may be stopped and actions associated to the RRC reconfiguration message may be executed. If the RRC reconfiguration message is received first, the WTRU may ignore the subsequently received target cell HS-SCCH order and only act on the RRC reconfiguration message.

A transaction identifier mechanism may be used to ensure that the network is made aware of what message the WTRU processed. The transaction identifier mechanism is used to ensure that the WTRU RRC entity ignores the reception of an RRC reconfiguration message if a target cell HS-SCCH order has already been received, or vice versa.

Conventionally, an information element (IE) "transaction identifier" in the RRC message may be used, together with an IE "message type" of the RRC message, for identification of an invocation of a downlink procedure. The WTRU gets an RRC transaction identifier with the first downlink RRC message, (e.g., radio bearer reconfiguration). The WTRU either accepts or rejects the transaction based on the IEs "message type" and "RRC transaction identifier" of the received RRC message. The IE "RRC transaction identifier" is appended in the RRC message and if subsequent RRC message has the same RRC transaction identifier they are rejected. In the case of a reconfiguration message, the RRC message is rejected even with a different RRC transaction identifier, if the RRC message has the same message type. Once the RRC procedure is complete, the WTRU sends the RRC transaction identifier of the original message in the RRC complete message.

Currently, the IEs "message type" and "RRC transaction identifier" in the variable TRANSACTION are only stored when a downlink RRC message is received. In accordance with one embodiment, the WTRU stores the "message type" and "RRC transaction identifier" in the variable TRANSACTION upon receiving the HS-SCCH order over the target cell. The "message type" may be set to one of the following: (1) a new message type, for example, "HS-SCCH order," (2) an existing RRC reconfiguration message type (such as "Physical Channel Reconfiguration", or "Transport Channel Reconfiguration"), or (3) ACTIVE SET UPDATE. Since the conventional HS-SCCH order cannot contain the value "RRC transaction identifier," the WTRU RRC entity has to set the "RRC transaction identifier" implicitly as part of the target cell HS-SCCH order reception procedure. For example, the "RRC transaction identifier" may be set to an arbitrary value (e.g., zero) or another value that will not be used by the network and reserved for the target cell HS-SCCH order.

If a WTRU receives a target cell HS-SCCH order prior to receiving an RRC reconfiguration message, and the WTRU detects that the transaction indicated by the "RRC transaction identifier" and the "message type" of the received RRC reconfiguration message is taking place due to the previously received target cell HS-SCCH order, the WTRU ignores the RRC reconfiguration message and continues with the ongoing reconfiguration process. Otherwise, the WTRU accepts the transaction.

If an RRC reconfiguration message is received prior to receiving a target cell HS-SCCH order and the WTRU detects that the transaction requested by the target cell HS-SCCH order is taking place, (i.e., ORDERED_RECONFIGURATION is set to TRUE), and optionally the "message type" in the variable TRANSACTIONS is set to one of the RRC reconfiguration, the WTRU ignores the transaction requested by the target cell HS-SCCH order and continues with the ongoing processes as if the target cell HS-SCCH order was not received. Otherwise, the transaction requested by the target cell HS-SCCH order is accepted, and the WTRU sets the "message type" and "RRC transaction identifier" applicable for the target cell HS-SCCH order in the variable TRANSACTIONS. Optionally, upon reception and acceptance of the transaction requested by the target cell HS-SCCH order, the WTRU sets the variable ORDERED_RECONFIGURATION to TRUE.

Once the reconfiguration procedure is complete, the WTRU prepares an RRC complete message. If the transaction corresponded to a target cell HS-SCCH order, the WTRU appends its RRC transaction identifier that is used only for the HS-SCCH order or alternatively an additional IE to the RRC complete message. Alternatively, a new RRC message, (e.g., HS-SCCH serving cell change (SCC) complete message), may be defined and used when the serving HS-DSCH cell change occurred due to the target cell HS-SCCH order.

Examples procedures for accepting or ignoring transactions which handles the serving HS-DSCH cell change are described below.

Figure 3:
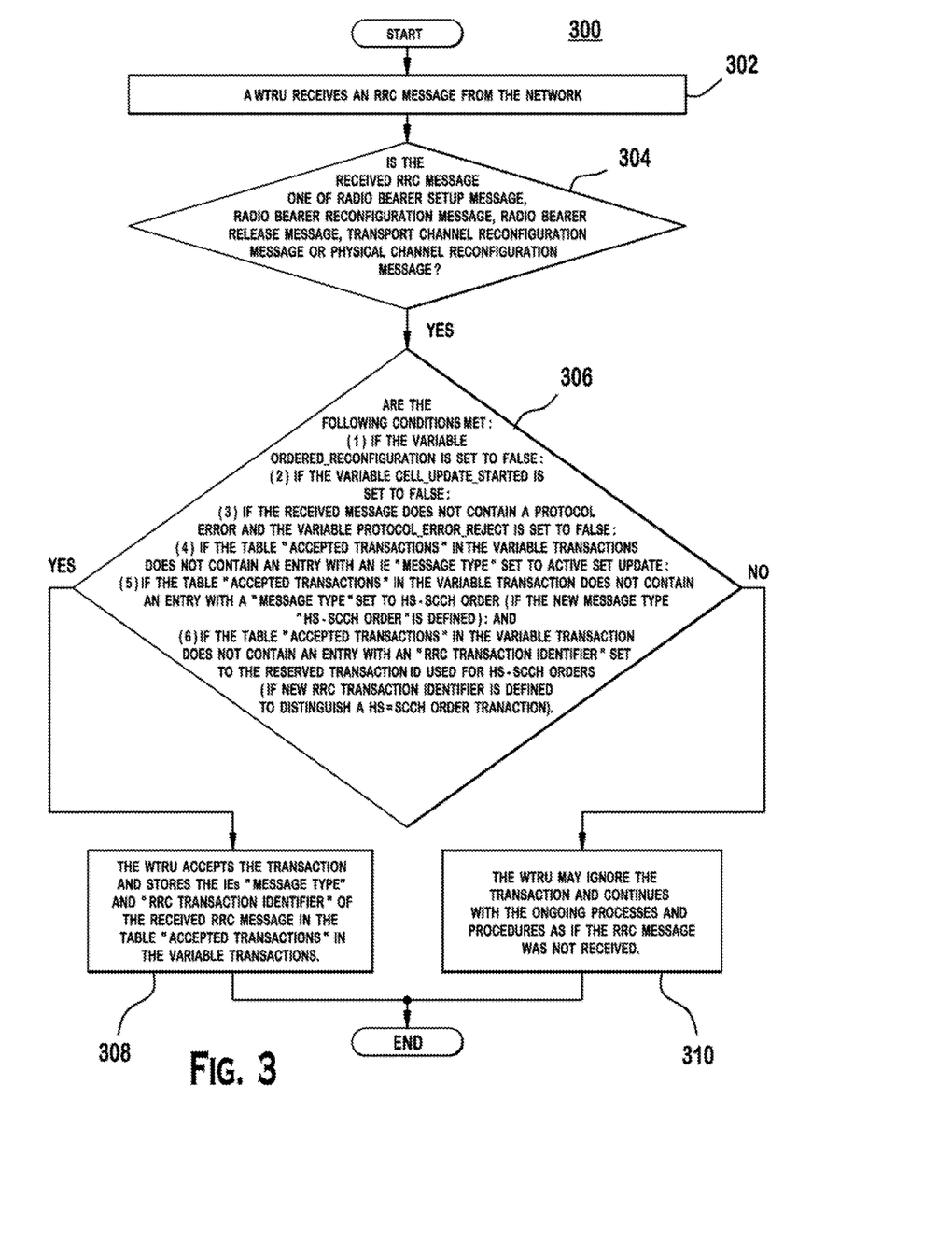
FIG. 3 is a flow diagram of an example process for processing an RRC message in accordance with one embodiment wherein a WTRU ignores an RRC message after receiving a target cell HS-SCCH order.

FIG. 3 is a flow diagram of an example process for processing an RRC message in accordance with one embodiment wherein a WTRU ignores an RRC message after receiving a target cell HS-SCCH order. A WTRU receives an RRC message from the network (step 302). If the IE "RRC transaction identifier" is included in the received RRC message, the WTRU determines if the received RRC message is one of RADIO BEARER SETUP message, RADIO BEARER RECONFIGURATION message, RADIO BEARER RELEASE message, TRANSPORT CHANNEL RECONFIGURATION message, or PHYSICAL CHANNEL RECONFIGURATION message (step 304). If so, the WTRU determines if the following conditions are met at step 306:

(1) If the variable ORDERED_RECONFIGURATION is set to FALSE;

(2) If the variable CELL_UPDATE_STARTED is set to FALSE;

(3) If the received message does not contain a protocol error and the variable PROTOCOL_ERROR_REJECT is set to FALSE;

(4) If the table "accepted transactions" in the variable TRANSACTIONS does not contain an entry with an IE "message type" set to ACTIVE SET UPDATE;

(5) If the table "accepted transactions" in the variable TRANSACTION does not contain an entry with an "message type" set to HS-SCCH order (if the new message type "HS-SCCH order" is defined); and (6) If the table "accepted transactions" in the variable TRANSACTION does not contain an entry with an "RRC transaction identifier" set to the reserved transaction ID used for HS-SCCH orders (if new RRC transaction identifier is defined to distinguish an HS-SCCH order transaction).

If all the conditions (1)-(6) are met, the WTRU accepts the transaction and stores the IEs "message type" and "RRC transaction identifier" of the received RRC message in the table "accepted transactions" in the variable TRANSACTIONS (step 308). If any one of the conditions (1)-(6) is not met, the WTRU, for example, may ignore the transaction and continues with the ongoing processes and procedures as if the RRC message was not received (step 310).

Figure 4:
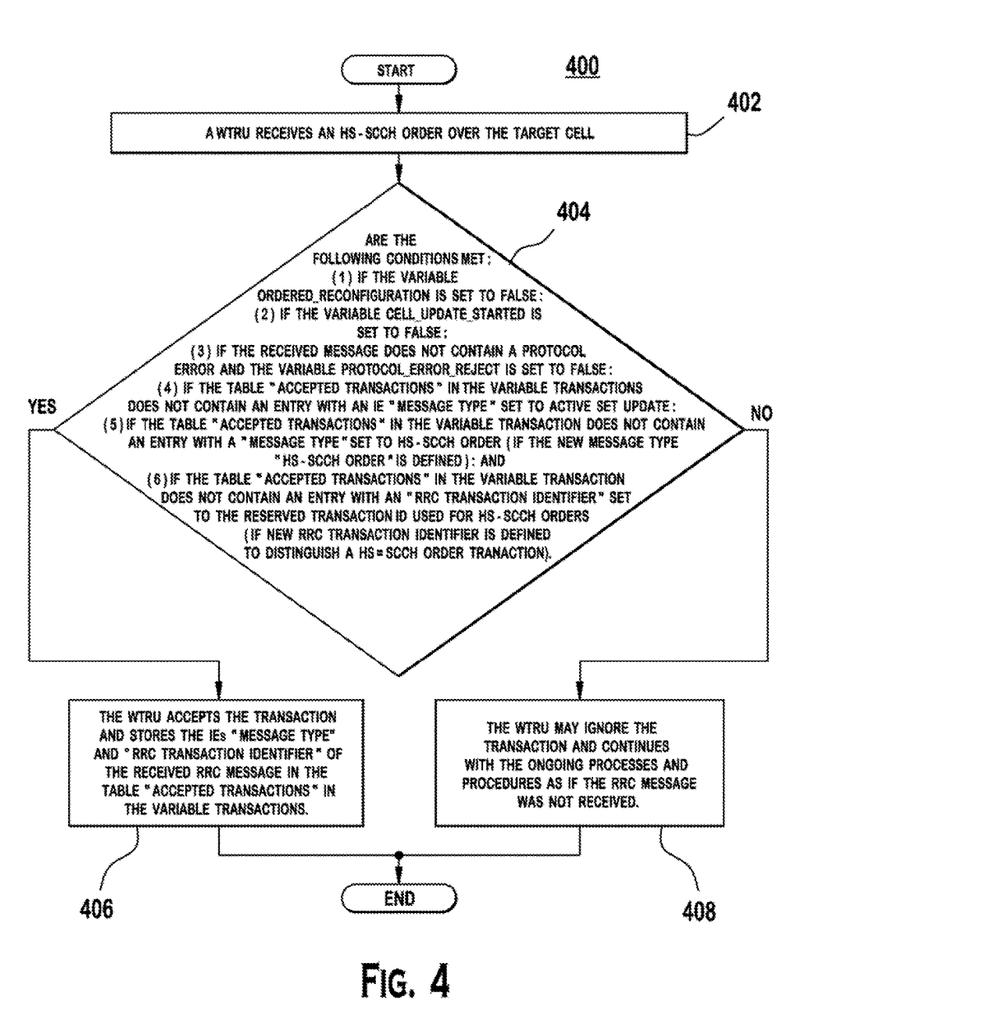
FIG. 4 is a flow diagram of an example process for processing an RRC message in accordance with one embodiment wherein a WTRU ignores a target cell HS-SCCH order after receiving an RRC message.

FIG. 4 is a flow diagram of an example process for processing an RRC message in accordance with one embodiment wherein a WTRU ignores a target cell HS-SCCH order after receiving an RRC message. A WTRU receives an HS-SCCH over the target cell (step 402). The WTRU looks into the variable "TRANSACTIONS" to see if there is a reconfiguration going on. Upon receipt of the target cell HS-SCCH order, the WTRU determines if all of the following conditions (1)-(6) are met at step 404:

(1) If the variable ORDERED_RECONFIGURATION is set to FALSE;

(2) If the variable CELL_UPDATE_STARTED is set to FALSE;

(3) If the received message does not contain a protocol error and the variable PROTOCOL_ERROR_REJECT is set to FALSE;

(4) If the table "accepted transactions" in the variable TRANSACTIONS does not contain an entry with an IE "message type" set to ACTIVE SET UPDATE;

(5) If the table "accepted transactions" in the variable TRANSACTION does not contain an entry with an "message type" set to HS-SCCH order (if the new message type "HS-SCCH order" is defined); and (6) If the table "accepted transactions" in the variable TRANSACTION does not contain an entry with an "RRC transaction identifier" set to the reserved transaction ID used for target cell HS-SCCH orders (if new RRC transaction identifier is defined to distinguish a HS-SCCH order transaction).

If all of the conditions (1)-(6) are met, the WTRU accepts the transactions and stores the IEs "message type" and "transaction identifier" used for the HS-SCCH order in the variable TRANSACTIONS (step 406). If any one of the conditions (1)-(6) is not met, the WTRU ignores the transaction and continues with the ongoing processes and procedures as if the target cell HS-SCCH order was not received (step 408).

If an activation time is not provided in the RRC reconfiguration message, the network will assume that a reconfiguration to the target cell will be ready within, for example, 40 ms of the transmission of one or more target cell HS-SCCH orders. At this time the network may start transmission over the target cell, but if the RRC reconfiguration message had provided a set of new HS-DSCH parameters, the network is not aware at this point in time whether the WTRU acted on the RRC message or on the target cell HS-SCCH order. This may result in the network using the wrong configuration and the WTRU may not receive the intended data.

In order to solve this problem, a restriction may be applied such that a conflict between the pre-configured serving cell information and the serving cell information provided in the RRC reconfiguration message is not allowed. If conflicting information is detected by the WTRU, an invalid configuration occurs. This would require that the network RRC entity send the same serving cell configuration provided in the pre-configuration of the active set update. The network sends an RRC reconfiguration message but the field containing the IEs that were pre-configured in the active set update procedure may be left empty. The RRC reconfiguration message may be a simplified message that only confirms to the WTRU that the handover has been approved by the network. If additional IEs are required, (e.g., other reconfiguration of radio bearers or transport channel that are not part of the pre-configured resources), the RRC reconfiguration message may include those parameters. If the network has decided to perform a handover to the target cell, the RRC reconfiguration message may contain all the required IEs to allow the WTRU to perform the handover to the target cell.

Alternatively, no such restrictions may be applied and the network determines which configuration the WTRU is using by waiting for the RRC complete message that indicates whether the WTRU acted on the RRC message or on the HS-SCCH order. This may delay the path switching time and increase the service interruption delays. Alternatively, the network may determine which configuration the WTRU is using by trying both configuration and detecting which one is used by the WTRU by sending data over both configurations and detecting on which one the WTRU receives the data correctly.

If conflicting reconfiguration occurs and the WTRU is not allowed to have conflicting reconfigurations, the RRC procedure may be rejected using the transaction identifier mechanism. More specifically, if there is conflicting configuration the WTRU sets the "RRC transaction identifier" in the table "rejected transactions" in variable TRANSACTIONS. The WTRU then transmits an RRC failure message to the network.

The network has an option to perform a synchronized handover for the serving HS-DSCH cell change and provide an activation time in the RRC reconfiguration message. In this case, the WTRU shall not perform the serving HS-DSCH cell change until the activation time. However, the activation that the WTRU should use is ambiguous if an HS-SCCH order is received first to the WTRU RRC entity. Additionally, the network may also not know whether the WTRU received the RRC reconfiguration message and if the WTRU will perform the handover at the given activation time or 40 ms after the HS-SCCH order. This may cause additional delays and potential loss of data if the network reconfigures too early.

In accordance with one embodiment, a synchronized handover may not be allowed for the serving HS-DSCH cell change. More specifically, if the target cell configuration has been preloaded, after triggering event 1D the WTRU does not expect an activation time different from "now." If an activation time different from "now" is provided in the RRC reconfiguration message the WTRU behavior is unspecified or an invalid configuration results. Alternatively, if the activation time is different from "now" the WTRU may ignore the activation time and perform the handover upon reception of the target cell HS-SCCH order. The network may only perform an unsynchronized handover.

Alternatively, the network is allowed to send an activation time, but the network configures the target Node B to send a target cell HS-SCCH order at the given activation time or X ms prior to the expiration of the activation time, where X is determined based on the reconfiguration requirement time (i.e., 40 ms) and optionally the amount of times the target cell HS-SCCH order is repeated.

The RRC reconfiguration message may include a set of radio bearer parameters which are not given at all as part of the pre-configured serving cell parameters. For example, this may happen if SRNC relocation occurred. In this case, the WTRU has to apply the new parameters as soon as possible or at the given activation time if present. If the RRC reconfiguration message is not received by the WTRU, or it is ignored due to the transaction identifier mechanism, the network will not be aware whether the WTRU reconfigured these parameters. Instead of waiting for the RRC complete message to determine if the reconfiguration takes place with the new parameters, the network may retransmit the RRC reconfiguration message if it contains additional serving cell parameters over the target cell as soon as the network determines that the reconfiguration is complete. This may be the same message that was transmitted over the source cell using the same RRC transaction identifier. If the WTRU has received this message already and performed the reconfiguration, the WTRU should ignore it and not act on it.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for serving high speed downlink shared channel (HS-DSCH) cell change, the method comprising:
   receiving pre-configured serving cell information for a target cell;
   receiving a high speed shared control channel (HS-SCCH) order on the target cell and a radio resource control (RRC) reconfiguration message on a source cell indicating a HS-DSCH serving cell change to the target cell;
   setting an ORDERED_RECONFIGURATION variable to true after reception of a first received one of: the HS-SCCH order or the RRC reconfiguration message; and
   when the ORDERED_RECONFIGURATION variable is set to true:
      acting in accordance with information elements included in the RRC reconfiguration message based on the RRC reconfiguration message being first received prior to the HS-SCCH order and stopping monitoring the target cell HS-SCCH, or
      acting in accordance with the pre-configured serving cell information based on the HS-SCCH order being first received prior to the RRC reconfiguration message and ignoring the information elements included in the RRC reconfiguration message.

2. The method of claim 1, wherein the acting in accordance with information elements of the RRC reconfiguration message includes acting in accordance with an activation time that identifies a time for a change of the serving HS-DSCH cell to the target cell when the RRC reconfiguration message is received prior to the HS-SCCH order.

3. The method of claim 2, wherein the WTRU ignores the activation time included in the RRC reconfiguration message on a condition that the HS-SCCH order is received before the RRC reconfiguration message.

4. The method of claim 1, wherein the RRC reconfiguration message is one of a radio bearer setup message, a radio bearer release message, a radio bearer reconfiguration message, a transport channel reconfiguration message, or a physical channel reconfiguration message.

5. The method of claim 1, wherein the acting in accordance with information elements of the RRC reconfiguration message includes acting in accordance with a serving cell parameter received in the RRC reconfiguration message that is not in conflict with the pre-configured serving cell information.

6. The method of claim 1, further comprising:
   transmitting an RRC complete message having an indication that the WTRU received the HS-SCCH order on a condition that the WTRU has not received the RRC reconfiguration message.

7. A wireless transmit/receive unit (WTRU) configured to perform serving high speed downlink shared channel (HS-DSCH) cell change, the WTRU comprising:
   a receiver configured to receive: (1) pre-configured serving cell information for a target cell, (2) a high speed shared control channel (HS-SCCH) order via the target cell and a radio resource control (RRC) reconfiguration message via a source cell to indicate a HS-DSCH serving cell change to the target cell; and
   a processor in communication with the receiver, the processor setting an ORDERED RECONFIGURATION variable to true after reception of a first received one of: the HS-SCCH order or the RRC reconfiguration message by the receiver;
   wherein when the ORDERED RECONFIGURATION variable is set to true, the processor is configured to:
      act in accordance with information elements included in the RRC reconfiguration message based on the RRC reconfiguration message being first received prior to the HS-SCCH order and stop monitoring the target cell HS-SCCH, or
      act in accordance with the pre-configured serving cell information based on the HS-SCCH order being first received prior to the RRC reconfiguration message and ignore the information elements included in the RRC reconfiguration message.

8. The WTRU of claim 7, wherein the receiver is configured to receive the RRC reconfiguration message including any one or more of a radio bearer setup message, a radio bearer release message, a radio bearer reconfiguration message, a transport channel reconfiguration message, or a physical channel reconfiguration message.

9. The WTRU of claim 7, wherein the processor acts in accordance with a serving cell parameter received in the RRC reconfiguration message that is not conflict with the pre-configured serving cell information.

10. The WTRU of claim 7, wherein the processor ignores an activation time included in the RRC reconfiguration message on a condition that the HS-SCCH order is received before the RRC reconfiguration message.

11. The WTRU of claim 7, wherein the processor sends an RRC complete message having an indication that the WTRU received the HS-SCCH order on a condition that the WTRU has not received the RRC reconfiguration message.

12. A wireless transmit/receive unit (WTRU) configured to perform serving high speed downlink shared channel (HS-DSCH) cell change, the WTRU comprising:
   a receiver configured to: receive pre-configured serving cell information for a target cell, receive a high speed shared control channel (HS-SCCH) order to indicate the HS-DSCH serving cell change to the target cell and receive a radio resource control (RRC) reconfiguration message to indicate the HS-DSCH serving cell change to the target cell; and
   a processor in communication with the receiver, wherein the processor is configured to:

select, based on which one of the RRC reconfiguration message and the HS-SCCH order is received by the WTRU first, one of: (1) information elements of included in the received RRC reconfiguration message, as first serving cell information, or (2) the pre-configured serving cell information; and act upon the selected serving cell information including an activation time that identifies a time for a change of the serving cell to the target cell on a condition that the information elements included in the received RRC reconfiguration message is received by the WTRU first.

13. The WTRU of claim 12, wherein the receiver is configured to receive any one or more of a setup message, a release message, or a reconfiguration message.

14. The WTRU of claim 12 wherein, on a condition that the RRC reconfiguration message is received by the WTRU first, the processor is configured to act on a received serving cell parameter that is not in conflict with the pre-configured serving cell information.

15. The WTRU of claim 12 wherein the processor ignores the activation time included in the RRC reconfiguration message on a condition that the received HS-SCCH order is received prior to the received RRC reconfiguration message.

16. The WTRU of claim 12, wherein the processor sends an RRC complete message with an indication that the WTRU received the HS-SCCH order on a condition that the WTRU has not yet received the RRC reconfiguration message.

* * * * *

UNITED STATES PATENT AND TRADEMARK OFFICE
CERTIFICATE OF CORRECTION

PATENT NO. : 9,838,922 B2
APPLICATION NO. : 15/133625
DATED : December 5, 2017
INVENTOR(S) : Benoit Pelletier et al.

Page 1 of 1

It is certified that error appears in the above-identified patent and that said Letters Patent is hereby corrected as shown below:

In the Claims

In Claim 7, Column 12, Lines 22-23, change "ORDERED RECONFIGURATION" to --ORDERED_RECONFIGURATION--.

In Claim 7, Column 12, Line 26, change "ORDERED RECONFIGURATION" to --ORDERED_RECONFIGURATION--.

In Claim 12, Column 13, Line 3, change "information elements of included in the received" to --information elements included in the received--.

Signed and Sealed this
Twenty-fifth Day of September, 2018

Andrei Iancu
*Director of the United States Patent and Trademark Office*